(12) United States Patent
O'Connor

(10) Patent No.: US 8,351,580 B1
(45) Date of Patent: Jan. 8, 2013

(54) PERSPECTIVE-BASED MEDIA PLAYBACK

(75) Inventor: James O'Connor, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 839 days.

(21) Appl. No.: 12/364,068

(22) Filed: Feb. 2, 2009

(51) Int. Cl.
*H04M 1/64* (2006.01)
*H04B 7/14* (2006.01)

(52) U.S. Cl. .......................................... 379/85; 455/18

(58) Field of Classification Search ............... 379/158, 379/202.01, 205.01
See application file for complete search history.

(56) References Cited

U.S. PATENT DOCUMENTS

| | | | | |
|---|---|---|---|---|
| 5,668,863 | A | * | 9/1997 | Bieselin et al. .......... 379/202.01 |
| 8,107,403 | B2 | * | 1/2012 | Barave et al. ................. 370/260 |
| 8,135,115 | B1 | * | 3/2012 | Hogg et al. ................ 379/88.22 |
| 2007/0165105 | A1 | * | 7/2007 | Lengeling et al. ......... 348/14.08 |

* cited by examiner

*Primary Examiner* — Fan Tsang
*Assistant Examiner* — Solomon Bezuayehu
(74) *Attorney, Agent, or Firm* — Anderson Gorecki & Rouille LLP

(57) ABSTRACT

A method, apparatus and computer program product for providing perspective-based media playback is presented. A recording of each of a plurality of parties participating in a communication session is acquired. A user is allowed to select a perspective of one of the parties participating in the communications session. At least a portion of at least one of the recordings related to the perspective selected by the user are then played back.

15 Claims, 11 Drawing Sheets

PERSPECTIVE-BASED MEDIA PLAYBACK

BACKGROUND

Reviewing of media recorded from communications systems is not a new field, and has been addressed by others. The recording may be used for multiple purposes, including their use as a tool to monitor a user experience, for example for a user calling into a contact center. The recordings can be also be used to provide an indication of the quality of service a particular customer was provided, to determine how a particular call agent is performing, and to evaluate an overall level of quality of service provided by the contact center. Certain media recording systems cull together associated conversations into the same interaction, and therefore encounter the issue of potentially several or more separate conversation streams occurring simultaneously within the same interaction with the communications system.

SUMMARY

Conventional mechanisms such as those explained above suffer from a variety of deficiencies. One such deficiency arises when there are simultaneous, but separate conversations/streams happening at the same time, but associated with a single interaction with a communications system.

For example, a scenario may occur wherein a Customer calls into a communications system and is connected to Agent X. Agent X puts customer on hold and talks with Agent Z. Agent X then disconnects with Agent Z and reconnects to the Customer. When reviewing this overall recorded interaction, the context for what is being heard can be confusing. At one point the user would simultaneously hear the on hold music and the voice path for the customer, as well as the conversation between Agent X and Agent Z. As call flows become more complex, and there is more potential for multiple conversations or streams to be happening at once, the potential for un-intelligible playback is compounded. Giving a perspective to playback allows for accurate recreation of a given experience within the recorded interaction.

Without a perspective being applied, what a reviewer hears is much less intelligible (a) conversation between Agent X/Customer (b) hold music and any Customer mutterings picked up while they're on hold overlaid with conversation between Agent X/Agent Z (c) reconnected conversation between Agent X/Customer.

Perspective-Based Media Playback was developed as a tool to play back multiple types of recorded media captured by a media recording service that have to be overlaid and orchestrated to reconstruct a given experience in the system. The problem of multiple perspectives to an interaction does not occur in competing products as our method of recording and associating various bits of recorded bits of recorded media (i.e. what makes up an 'interaction') includes adjacent conversations presented in the same space. Perspective allows adjacent conversations making up an overall 'interaction' to be filtered based on whose experience you want to recreate while reviewing the recorded media. Existing solutions do not provide the type of contextual analysis and view of the larger-scoped interaction with a communications system.

Embodiments of the invention significantly overcome such deficiencies and provide mechanisms and techniques that provide a perspective-based media playback method and apparatus. Media editors are known; however, changing how the tracks/media are played back/displayed based on a given perspective in an interaction solves the above-described problem. Within the application, separated media streams are each on individual layers or tracks as defined by the participants in the creation of that stream. They are organized into a timeline/track-based presentation area. Selecting a given layer will select that layer's owner(s) as the perspective to playback. Upon playback, the system will only play back those captured medias (audio, video, DTMF, screen captures) that are visible to the selected perspective.

In a particular embodiment of a method for providing a perspective-based media playback, includes providing a recording of each of a plurality of parties participating in a communication session. The method further includes allowing a user to select a perspective of one of the parties participating in the communications session. The method further includes playing back at least a portion of at least one of the recordings related to the perspective selected by the user.

Other embodiments include a computer readable medium having computer readable code thereon for providing perspective-based media playback. The computer readable medium includes instructions for providing a recording of each of a plurality of parties participating in a communication session. The computer readable medium further includes instructions for allowing a user to select a perspective of one of the parties participating in the communications session. The computer readable medium further includes instructions for playing back at least a portion of at least one of the recordings related to the perspective selected by the user.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides prospective-based media playback as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing prospective-based media playback as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

By way of the presently described perspective-based media playback, separated media streams are each on individual layers or tracks as defined by the participants in the creation of that stream. They are organized into a timeline/track-based presentation area. Selecting a given layer will select that layer's owner(s) as the perspective to playback. Upon playback, the system will only play back those captured medias (audio, video, DTMF, screen captures) that are visible to the selected perspective.

Referring back to the example involving the Customer, Agent X and Agent Z, switching to the Customer perspective before playback would result in hearing: (a) conversation between Agent X and the Customer (b) hold music and any Customer mutterings picked up while they're on hold and (c) reconnected conversation between Agent X and the Customer.

In the above example, switching to Agent X's perspective before playback would result in hearing (a) conversation between Agent X and the Customer, (b) conversation between Agent X and Agent Z and (c) reconnected conversation between Agent X and the Customer.

The presently described method and apparatus group together all media(s) and points of view responsible for the creation of given experience within a communications system. For example, in the previous call-flow given in section F the system has pulled in the conversation between Agent X and Agent Z, even though the Customer triggered the interaction because the conversation between Agent X and Agent Z directly affects the experience for Customer. Without the creation of the perspective-based media playback, efficient review a given interaction is impossible as conversations would become un-intelligible to a reviewer without a concept of 'perspective'.

The application also visually distinguishes between media and conversations within the interaction based on the participants and the type of recorded media, and displays them on a timeline/track basis not unlike familiar media-editing software. When the selected perspective is changed, the UI grayed out sections of recorded media that do not apply to the given perspective. This makes it easy to determine what portions of media directly affect, and what portions are adjacent to a given experience.

Figure 1:
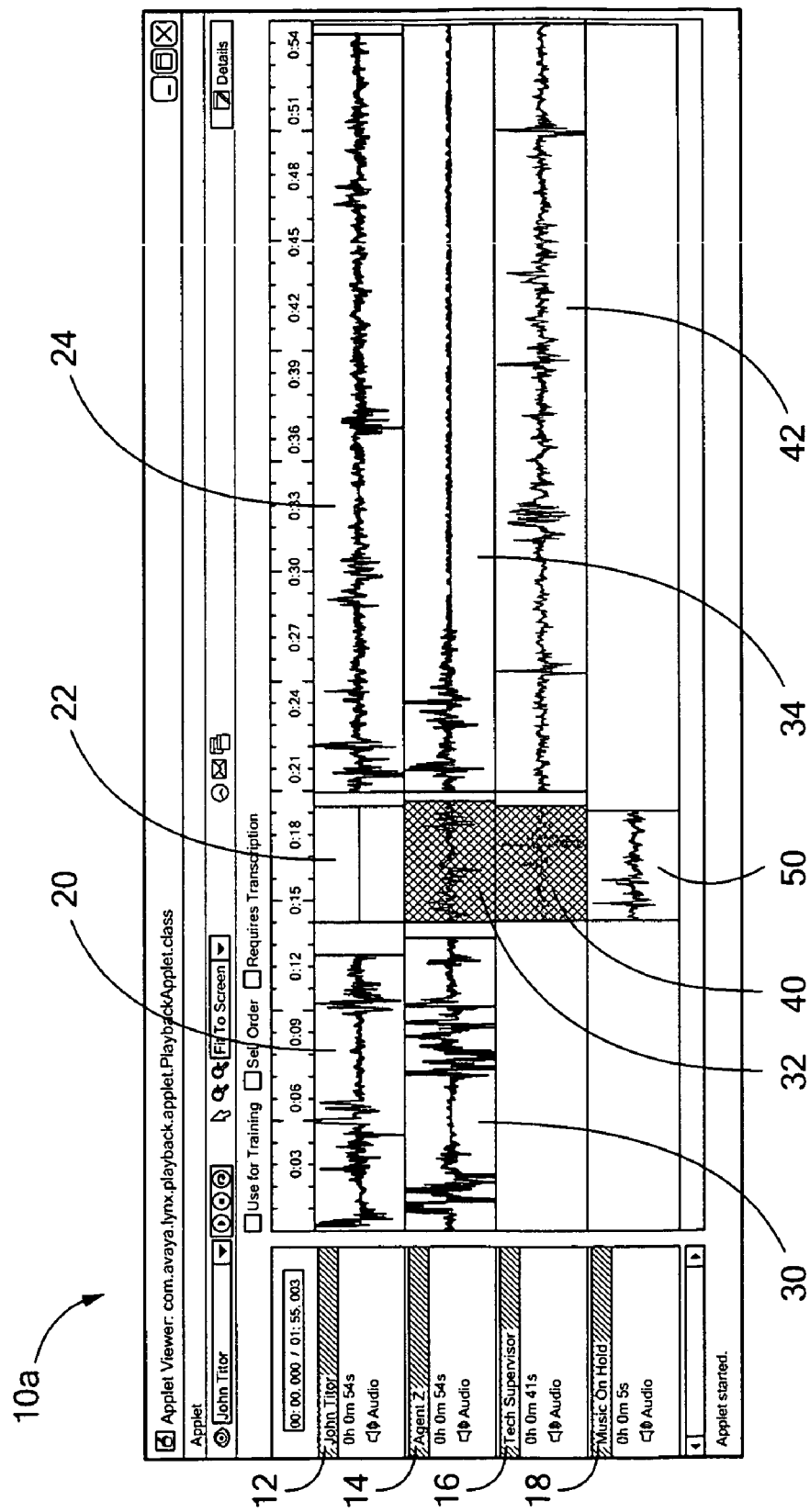
FIG. 1 depicts a screen shot of a Graphical User Interface (GUI) showing a track-and-timeline-based media player depicting a selected first perspective.

Referring now to FIG. 1, a Graphical User Interface (GUI) showing a track-and-timeline-based media player depicting a selected first perspective is presented. The GUI 10a shows audio recordings for a total of four parties that participated in the interaction. The first party is customer 12, the second party is agent 14, the third party is supervisor 16 and the fourth party is the on-hold music 18. In this example the user has selected the perspective of customer 12. Accordingly, all interactions that involved customer 12 directly are shown and will be played, while interactions not directly involving customer 12 are shown as grayed out and will not be played. When this perspective is played back, the first section 20 of the customer 12 recording will be played back as well as the first section 30 of agent 14 recording. Following this the second portion 22 of the customer recording is played back as well as the first section 50 of the on-hold music. The second portion 32 of agent 14 recording is not played back, and the first section 40 of supervisor 16 recording is not played back. Following this, the third section 24 of the customer 12 recording will be played back as well as the third section 34 of agent 14 recording and the second section 42 of supervisor 16 recording. The user is presented with the audio provided by and received by the customer 12, so that the customer experience is reviewed.

Figure 2:
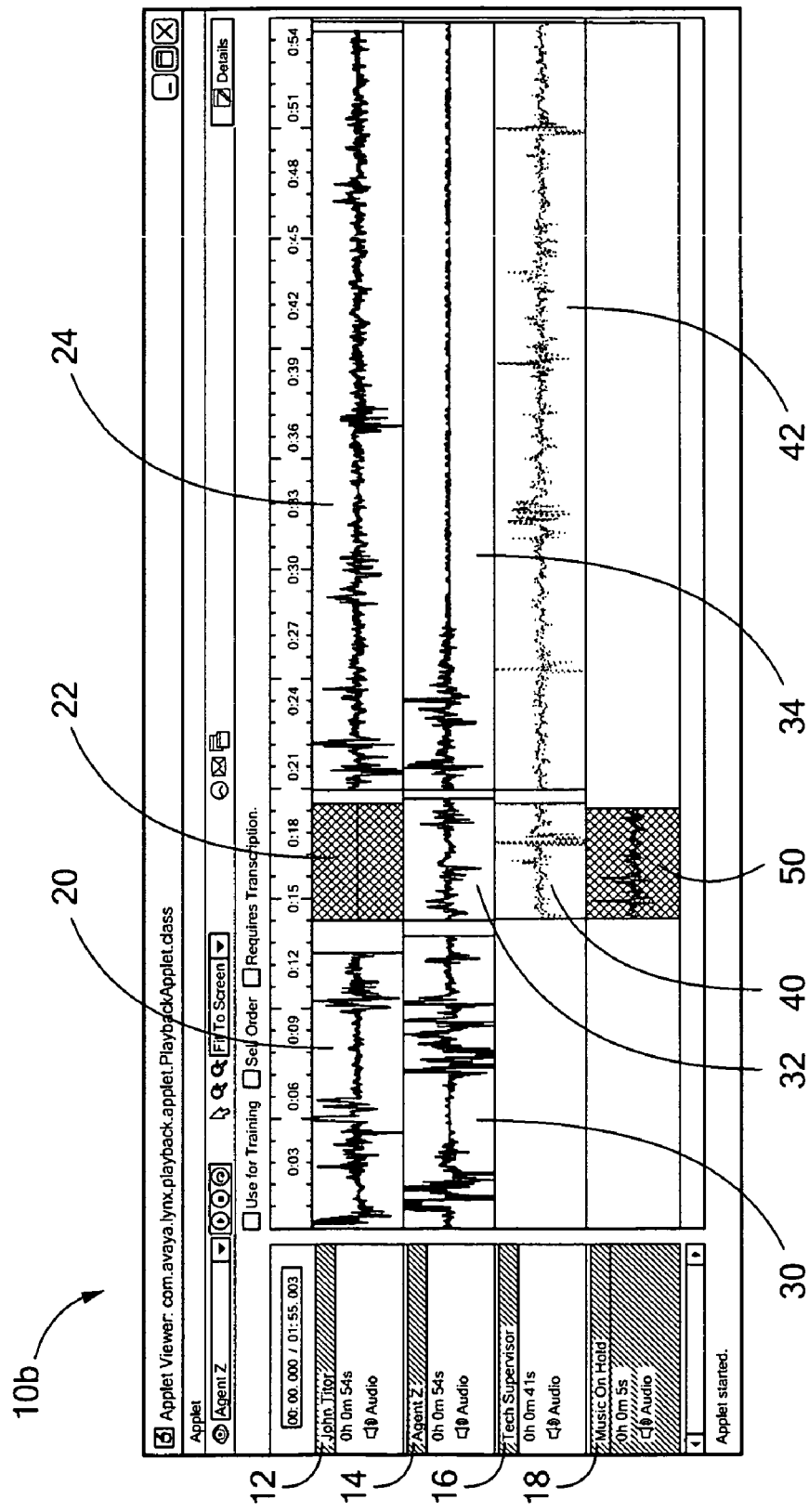
FIG. 2 depicts a screen shot of a Graphical User Interface (GUI) showing a track-and-timeline-based media player depicting a selected second perspective.

Referring now to FIG. 2, an example of a GUI 10*b* wherein the user has selected the perspective of agent 14 is shown. Accordingly, all interactions that involved agent 14 directly are shown and will be played, while interactions not directly involving agent 14 are shown as grayed out and will not be played. When this perspective is played back, the first section 20 of the customer 12 recording will be played back as well as the first section 30 of agent 14 recording. Following this the second portion 32 of the agent recording is played back as well as the first section 40 of supervisor 16. The second portion 22 of customer 12 recording is not played back, and the first section 50 of the on-hold music recording is not played back. Following this, the third section 24 of the customer 12 recording will be played back as well as the third section 34 of agent 14 recording and the second section 42 of supervisor 16 recording. The user is presented with the audio provided by and received by the agent 12.

Figure 3:
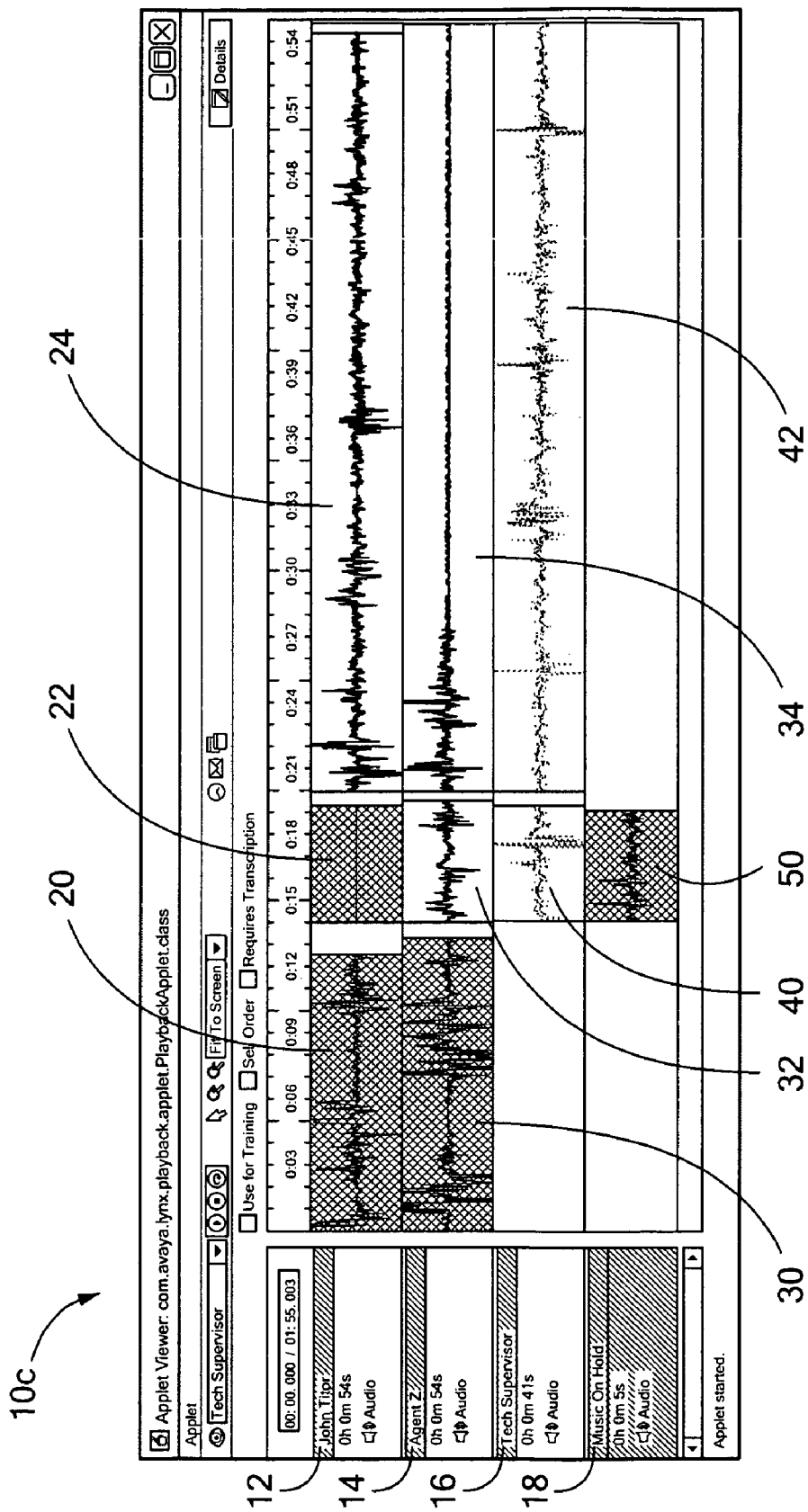
FIG. 3 depicts a screen shot of a Graphical User Interface (GUI) showing a track-and-timeline-based media player depicting a selected third perspective.

FIG. 3 shows an example of a GUI 10*c* wherein the user has selected the perspective of supervisor 16. Accordingly, all interactions that involved supervisor 16 directly are shown and will be played, while interactions not directly involving supervisor 16 are shown as grayed out and will not be played. When this perspective is played back, the first section 20 of the customer 12 recording as well as the first section 30 of agent 14 recording will not be played back, and are shown as grayed out. Following this the second portion 32 of the agent recording is played back as well as the first section 40 of supervisor 16. The second portion 22 of customer 12 recording is not played back, and the first section 50 of the on-hold music recording is not played back. Following this, the third section 24 of the customer 12 recording will be played back as well as the third section 34 of agent 14 recording and the second section 42 of supervisor 16 recording. The user is presented with the audio provided by and received by the supervisor 16.

Figure 4:
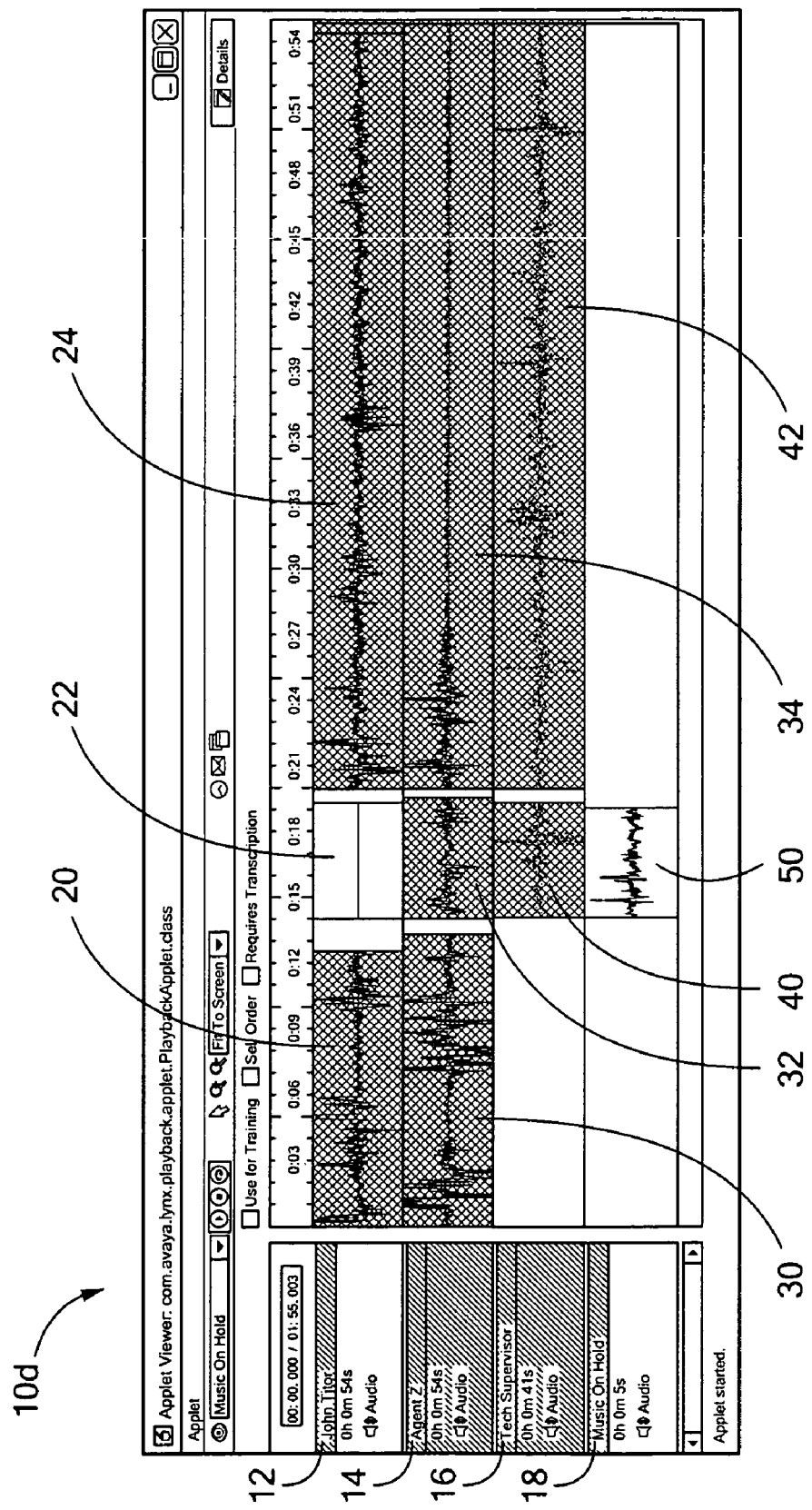
FIG. 4 depicts a screen shot of a Graphical User Interface (GUI) showing a track-and-timeline-based media player depicting a selected fourth perspective.

Referring now to FIG. 4, an example of a GUI 10*bd* wherein the user has selected the perspective of on-hold music 18 is shown. Accordingly, all interactions that involved on-hold music 18 directly are shown and will be played, while interactions not directly involving on-hold music 18 are shown as grayed out and will not be played. When this perspective is played back, the first section 20 of the customer 12 recording will not be played back as well as the first section 30 of agent 14 recording not being played back. Following this the second portion 22 of the customer recording is played back as well as the first section 50 of on-hold music 18. The second portion 32 of customer 12 recording is not played back, and the first section 40 supervisor 18 is not played back. Following this, the third section 24 of the customer 12 recording will not be played back, and neither will the third section 34 of agent 14 recording and the second section 42 of supervisor 16 recording.

Figure 5:
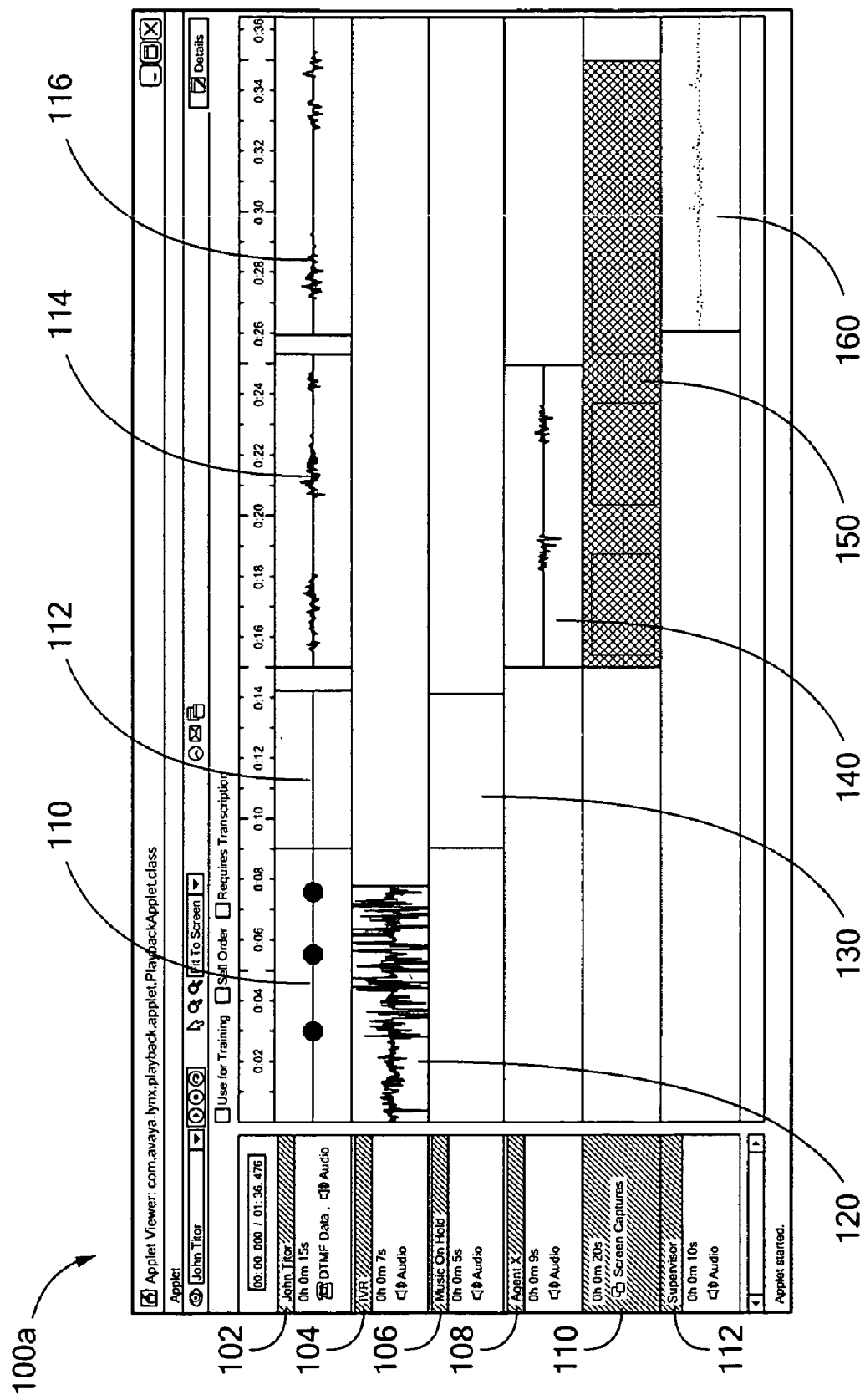
FIG. 5 depicts a screen shot of a Graphical User Interface (GUI) showing a track-and-timeline-based media player depicting a selected first perspective.

Referring now to FIG. 5, a Graphical User Interface (GUI) 100*a* showing a track-and-timeline-based media player depicting a selected first perspective is presented. The GUI 100*a* shows media recordings for a total of six parties that participated in the interaction. The first party is customer 102, the second party is (Interactive Voice Response (IVR) system 104, the third party is the on-hold music 106, the fourth party is agent 108, the fifth party is screen captures 110 and the sixth party is supervisor 112. In this example the user has selected the perspective of customer 102. Accordingly, all interactions that involved customer 102 directly are shown and will be played, while interactions not directly involving customer 102 are shown as grayed out and will not be played. When this perspective is played back, the first section 110 of the customer 102 recording will be played back as well as the first section 120 of IVR 104 recording. Customer recording section 110 comprises Dual Tone Multi Frequency (DTMF) tones, entered by customer 102 via a telephone keypad or the like. Following this the second portion 112 of the customer recording is played back as well as the first section 130 of the on-hold music. Following this, the third section 114 of the customer 102 recording will be played back as well as the first section 140 of agent 108 recording. The screen captures 150 are not presented, and are represented as grayed out. Following this, fourth section 116 of customer 102 is played back as is the first section 160 of supervisor 112. The user is presented with the experience provided by and received by the customer 102, so that the customer experience is reviewed.

Figure 6:
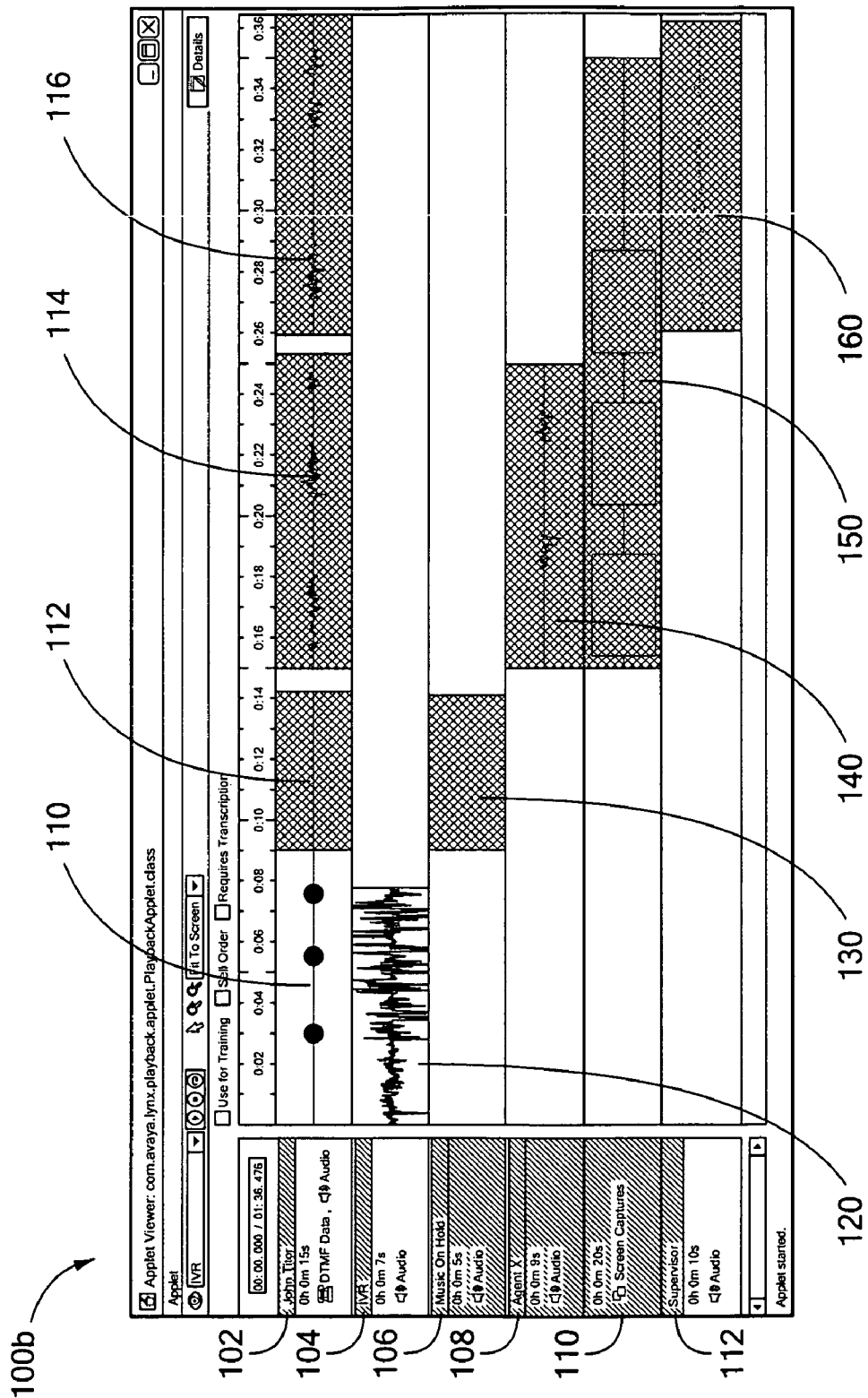
FIG. 6 depicts a screen shot of a Graphical User Interface (GUI) showing a track-and-timeline-based media player depicting a selected second perspective.

Referring now to FIG. 6, the user has selected the perspective of IVR 104. Accordingly, all interactions that involved IVR 104 directly are shown and will be played, while interactions not directly involving IVR 104 are shown as grayed out and will not be played. When this perspective is played back, the first section 110 of the customer 102 recording will be played back as well as the first section 120 of IVR 104 recording. All of the remaining recordings 112, 114, 116, 130, 140, 150 and 160 will not be played back and are shown as grayed out.

Figure 7:
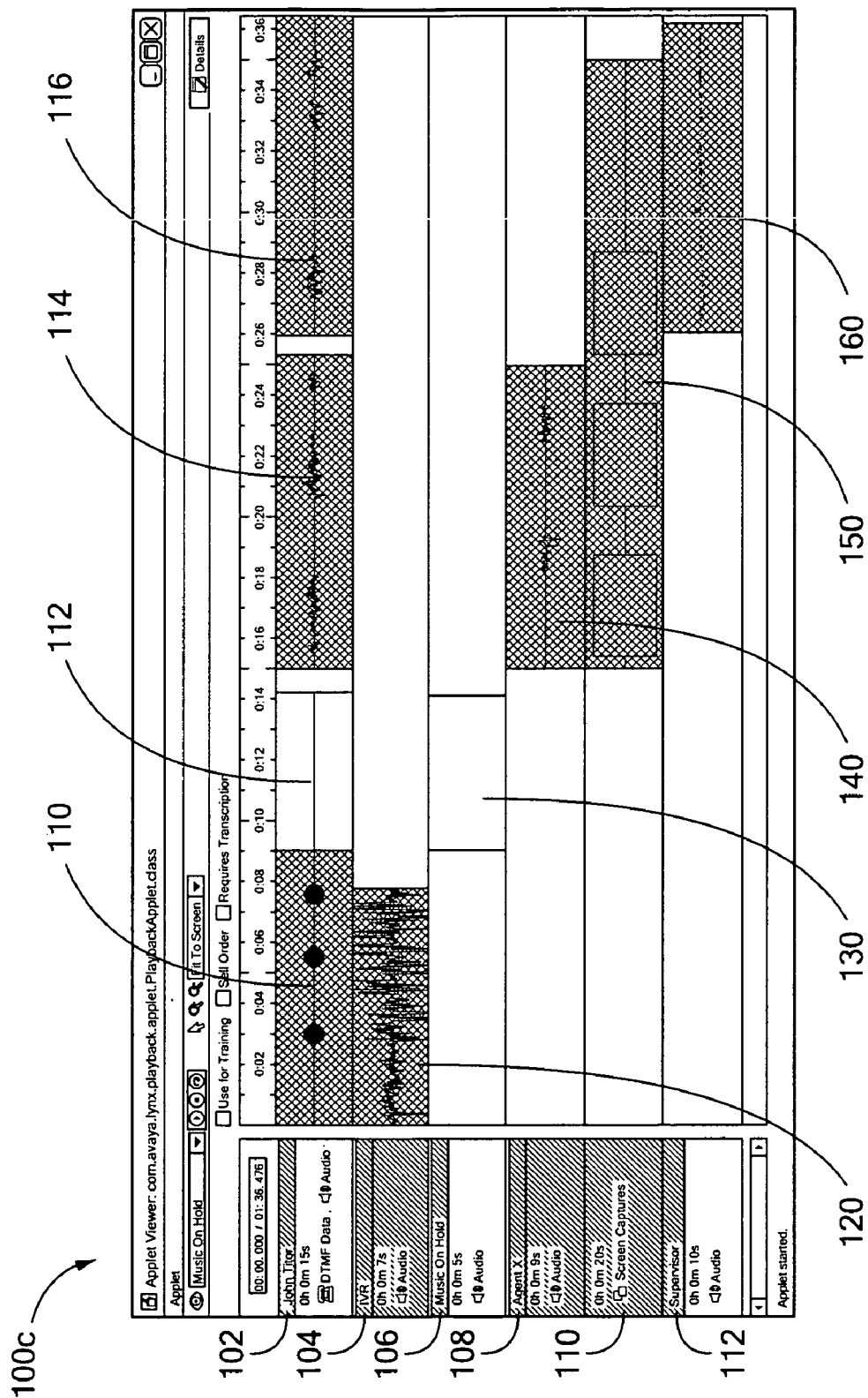
FIG. 7 depicts a screen shot of a Graphical User Interface (GUI) showing a track-and-timeline-based media player depicting a selected third perspective.

FIG. 7 shows GUI 10*c* wherein the user has selected the perspective of the on-hold music 106. Accordingly, all interactions that involved the on-hold music 106 directly are shown and will be played, while interactions not directly involving the on-hold music 106 are shown as grayed out and will not be played. When this perspective is played back, the first section 110 of the customer 102 recording will not be played back and neither will the first section 120 of IVR 104 recording. Following this the second portion 112 of the customer recording is played back as well as the first section 130 of the on-hold music. Following this all of the remaining recordings 114, 116, 140, 150 and 160 will not be played back and are shown as grayed out.

Figure 8:
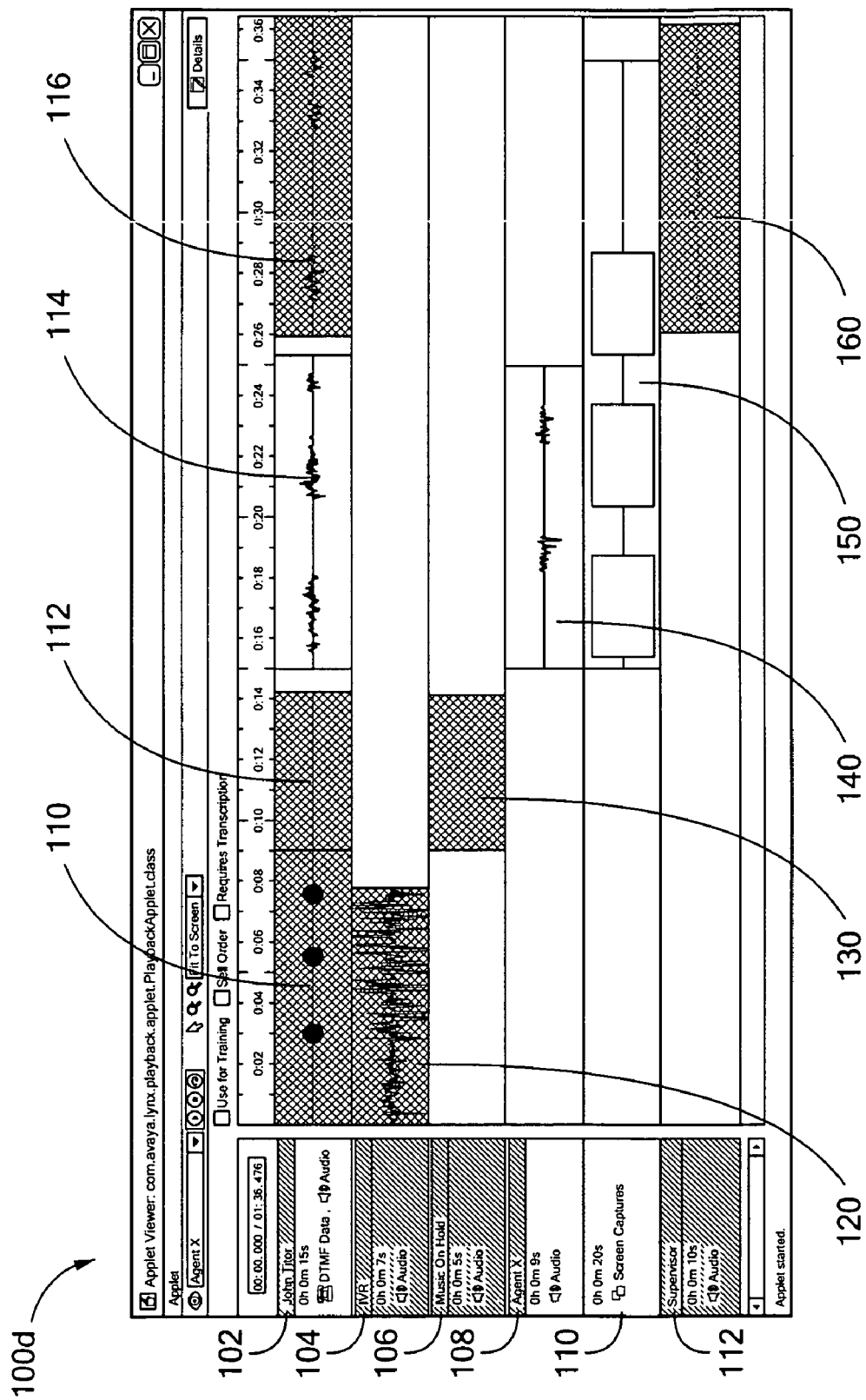
FIG. 8 depicts a screen shot of a Graphical User Interface (GUI) showing a track-and-timeline-based media player depicting a selected fourth perspective.

Referring now to FIG. 8, the user has selected the perspective of agent 108. Accordingly, all interactions that involved agent 108 directly are shown and will be played, while interactions not directly involving agent 108*re* shown as grayed out and will not be played. When this perspective is played back, the first section 110 of the customer 102 recording will not be played back and neither will the first section 120 of IVR 104 recording. Similarly, the second portion 112 of the customer recording is not played back and neither is the first section 130 of the on-hold music. Following this, the third section 114 of the customer 102 recording will be played back as well as the first section 140 of agent 108 recording. Also played back are the screen captures 150. Following this, fourth section 116 of customer 102 is not played back and neither is the first section 160 of supervisor 112. The user is presented with the experience provided by and received by the agent 108, so that the agent experience is reviewed.

Figure 9:
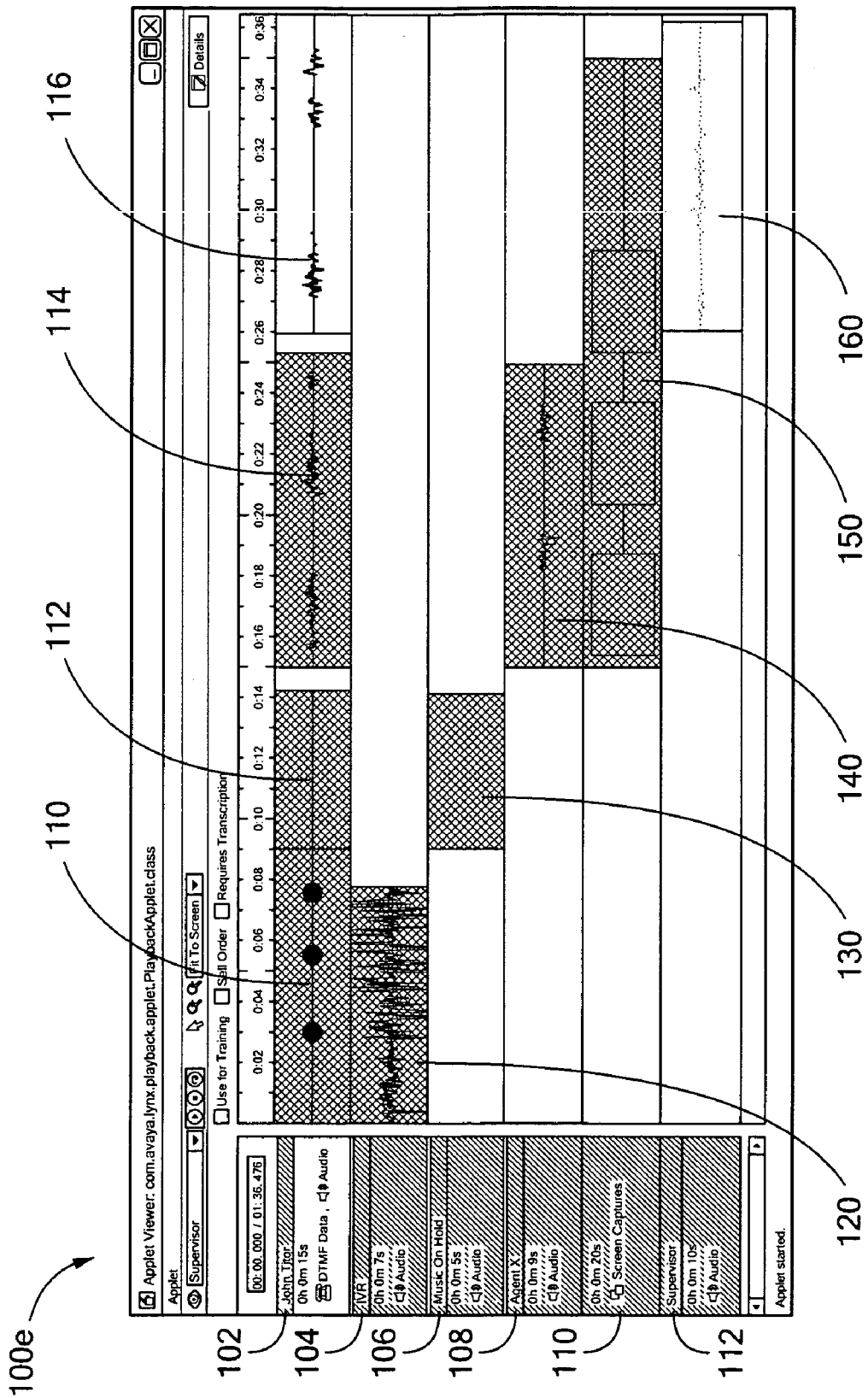
FIG. 9 depicts a screen shot of a Graphical User Interface (GUI) showing a track-and-timeline-based media player depicting a selected fifth perspective.

FIG. 9 shows GUI 10*e* wherein the user has selected the perspective of the supervisor 112. Accordingly, all interactions that involved supervisor 112 directly are shown and will be played, while interactions not directly involving supervisor 112 are shown as grayed out and will not be played. When this perspective is played back, recorded sections 110, 112, 14, 120, 130, 140 and 150 will not be played back. Following this the fourth section 116 is played back as well as the first section 160 of supervisor 112.

Figure 10:
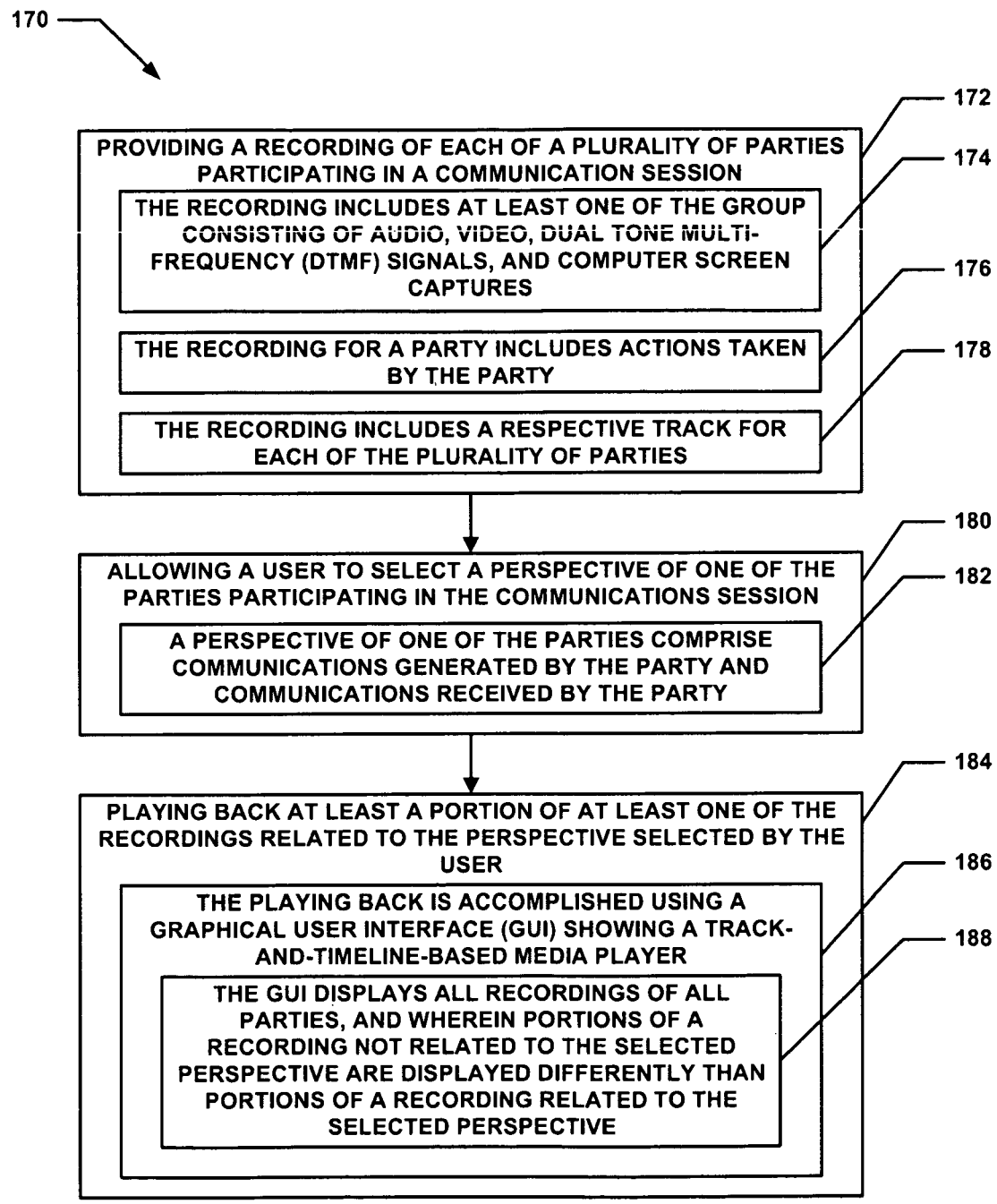
FIG. 10 illustrates an example flow diagram of a particular embodiment of a method for performing perspective-based media playback in accordance with embodiments of the invention.

A flow chart of the presently disclosed method is depicted in FIG. 10. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 10, a particular embodiment of a method 170 for providing perspective-based media playback is shown. Method 170 begins with processing block 172 which discloses providing a recording of each of a plurality of parties participating in a communication session. As shown in processing block 174, the recording includes at least one of the group consisting of audio, video, Dual Tone Multi-Frequency (DTMF) signals, and computer screen captures. As further shown in processing block 176, the recording for a party includes actions taken by the party. Processing block 178 shows wherein the recording includes a respective track for each of the plurality of parties.

Processing block 180 states allowing a user to select a perspective of one of the parties participating in the communications session. As shown in processing block 182, a perspective of one of the parties comprises communications generated by the party and communications received by the party.

Processing continues with processing block 184 which recites playing back at least a portion of at least one of the recordings related to the perspective selected by the user. Processing block 186 shows wherein the playing back is accomplished using a Graphical User Interface (GUI) showing a track-and-timeline-based media player. As further shown in processing block 188, portions of a recording not related to the selected perspective are displayed differently in the GUI than portions of a recording related to the selected perspective. For example, the portions of a recording not related to the selected perspective may be shown as grayed out in the GUI.

Figure 11:
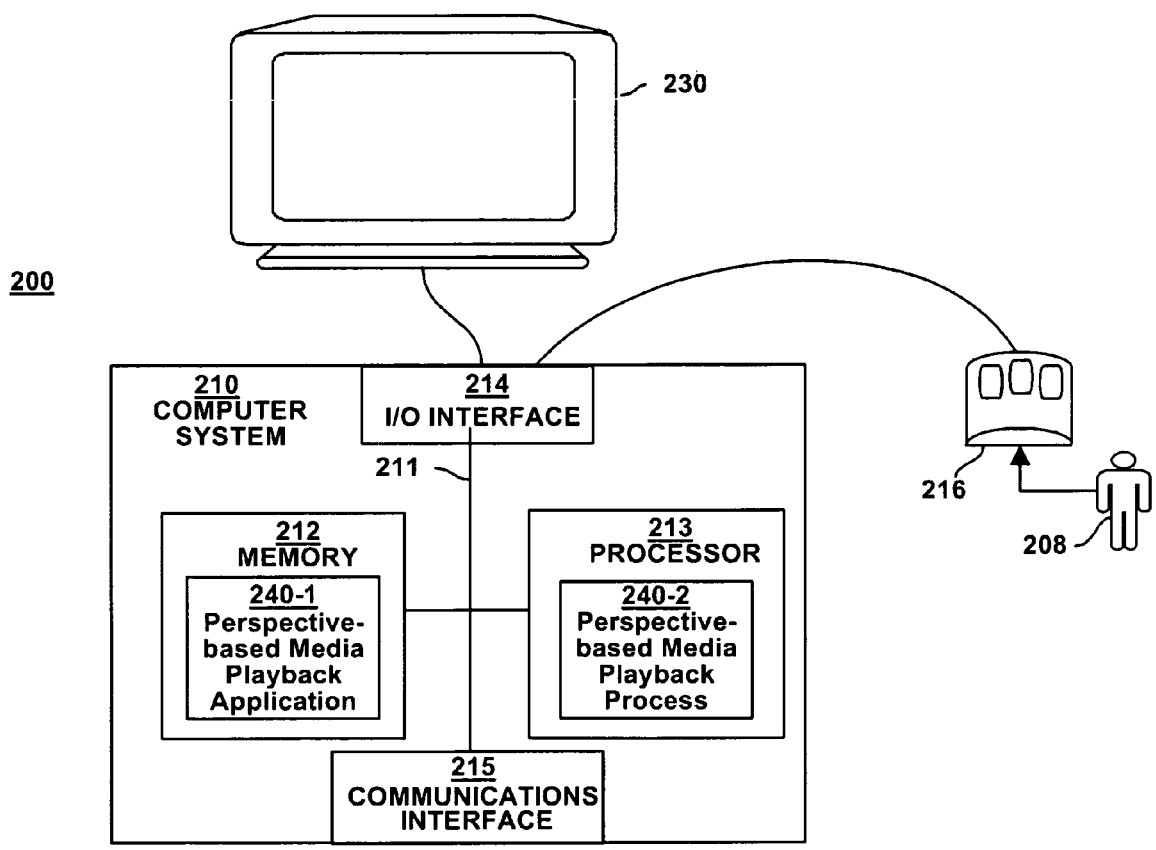
FIG. 11 illustrates an example computer system architecture for a computer system that performs perspective-based media playback in accordance with embodiments of the invention.

FIG. 11 is a block diagram illustrating example architecture of a computer system 200 that executes, runs, interprets, operates or otherwise performs a perspective-based media playback operating application 240-1 and perspective-based media playback operating process 240-2 suitable for use in explaining example configurations disclosed herein. The computer system 210 may be any type of computerized device such as a personal computer, workstation, portable computing device, console, laptop, network terminal or the like. An input device 216 (e.g., one or more customer/developer controlled devices such as a keyboard, mouse, etc.) couples to processor 213 through I/O interface 214, and enables a customer 208 to provide input commands, and generally control the graphical customer interface 260 that the perspective-based media playback operating application 240-1 and process 240-2 provides on the display 230. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a perspective-based media playback operating application 240-1 as explained herein. The perspective-based media playback operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a perspective-based media playback operating application 240-1. Execution of a perspective-based media playback operating application 240-1 in this manner produces processing functionality in the perspective-based media playback operating process 240-2. In other words, the perspective-based media playback operating process 240-2 represents one or more portions or runtime instances of a perspective-based media playback operating application 240-1 (or the entire a perspective-based media playback operating application 240-1) performing or executing within or upon the processor 213 in the computerized device 210 at runtime.

It is noted that example configurations disclosed herein include the perspective-based media playback operating application 240-1 itself (i.e., in the form of un-executed or non-performing logic instructions and/or data). The perspective-based media playback operating application 240-1 may be stored on a computer readable medium (such as a floppy disk), hard disk, electronic, magnetic, optical, or other computer readable medium. A perspective-based media playback operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a perspective-based media playback operating application 240-1 in the processor 213 as the perspective-based media playback operating process 240-2. Those skilled in the art will understand that the computer system 210 may include other processes and/or software and hardware components, such as an operating system not shown in this example.

A display 230 need not be coupled directly to computer system 210. For example, the perspective-based media playback operating application 240-1 can be executed on a remotely accessible computerized device via the network interface 215. In this instance, the graphical customer interface 260 may be displayed locally to a customer 208 of the remote computer, and execution of the processing herein may be client-server based.

During operation, processor 213 of computer system 200 accesses memory system 212 via the interconnect 211 in order to launch, run, execute, interpret or otherwise perform the logic instructions of the persistent security application 240-1. Execution of persistent security application 240-1 produces processing functionality in perspective-based media playback process 240-2. In other words, the perspective-based media playback process 240-2 represents one or more portions of the perspective-based media playback application 240-1 (or the entire application) performing within or upon the processor 213 in the computer system 200.

It should be noted that, in addition to the perspective-based media playback process 240-2, embodiments herein include the perspective-based media playback application 240-1 itself (i.e., the un-executed or non-performing logic instructions and/or data). The perspective-based media playback application 240-1 can be stored on a computer readable medium such as a floppy disk, hard disk, or optical medium. The perspective-based media playback application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of perspective-based media playback application 140-1 in processor 113 as the perspective-based media playback process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   providing a recording of each of at least three parties participating in a communication session, wherein said recording of each of a plurality of parties participating in a communication session comprises a separated media stream for each participant including all actions taken by said participant in said communication session and wherein during playback all interactions in said communication session that directly involve said participant will be played while interactions in said communication session not directly involving said participant are not played;
   allowing a user to select a perspective of one of said parties participating in said communications session, wherein said perspective of one of said parties comprise communications generated by said party, communications received by said party, and actions taken by said party; and playing back at least a portion of said recordings related to said perspective selected by said user, wherein said recordings includes communications generated and received by one of said parties.

2. The method of claim 1 wherein said playing back is accomplished using a Graphical User Interface (GUI) showing a track-and-timeline-based media player.

3. The method of claim 2 wherein portions of a recording not related to the selected perspective are displayed differently in said GUI than portions of a recording related to the selected perspective.

4. The method of claim 1 wherein said recording includes at least one of the group consisting of audio, video, Dual Tone Multi-Frequency (DTMF) signals, and computer screen captures.

5. The method of claim 1 wherein said recording includes a respective track for each of said plurality of parties.

6. A non-transitory computer readable storage medium having computer readable code thereon for providing perspective-based media playback, the medium including instructions in which a computer system performs operations comprising:

providing a recording of each of at least three parties participating in a communication session wherein said recording of each of a plurality of parties participating in a communication session comprises a separated media stream for each participant including all actions taken by said participant in said communication session and wherein during playback all interactions in said communication session that directly involve said participant will be played while interactions in said communication session not directly involving said participant are not played;

allowing a user to select a perspective of one of said parties participating in said communications session wherein said perspective of one of said parties comprise communications generated by said party, communications received by said party, and actions taken by said party; and playing back at least a portion of said recordings related to said perspective selected by said user, wherein said recordings includes communications generated and received by one of said parties.

7. The computer readable medium of claim 6 further comprising instructions wherein said playing back is accomplished using a Graphical User Interface (GUI) showing a track-and-timeline-based media player.

8. The computer readable medium of claim 7 further comprising instructions wherein portions of a recording not related to the selected perspective are displayed differently in said GUI than portions of a recording related to the selected perspective.

9. The computer readable medium of claim 6 further comprising instructions wherein said recording includes at least one of the group consisting of audio, video, Dual Tone Multi-Frequency (DTMF) signals, and computer screen captures.

10. The computer readable medium of claim 6 further comprising instructions wherein said recording includes a respective track for each of said plurality of parties.

11. A computer system comprising:

a memory;

a processor;

a communications interface;

an interconnection mechanism coupling the memory, the processor and the communications interface; and wherein the memory is encoded with an application providing perspective-based media playback, that when performed on the processor, provides a process for processing information, the process causing the computer system to perform the operations of:

providing a recording of each of at least three parties participating in a communication session wherein said recording of each of a plurality of parties participating in a communication session comprises a separated media stream for each participant including all actions taken by that directly involve said participant in said communication session and wherein during playback all interactions in said communication session that directly involve said participant will be played while interactions in said communication session not directly involving said participant are not played;

allowing a user to select a perspective of one of said parties participating in said communications session wherein said perspective of one of said parties comprise communications generated by said party, communications received by said party, and actions taken by said party; and playing back at least a portion of said recordings related to said perspective selected by said user, wherein said recordings includes communications generated and received by one of said parties.

12. The computer system of claim 11 wherein said playing back is accomplished using a Graphical User Interface (GUI) showing a track-and-timeline-based media player.

13. The computer system of claim 12 wherein portions of a recording not related to the selected perspective are displayed differently in said GUI than portions of a recording related to the selected perspective.

14. The computer system of claim 11 wherein said recording includes at least one of the group consisting of audio, video, Dual Tone Multi-Frequency (DTMF) signals, and computer screen captures.

15. The computer system of claim 11 wherein said recording includes a respective track for each of said plurality of parties.

* * * * *